(12) United States Patent
Panasik

(10) Patent No.: US 6,884,012 B2
(45) Date of Patent: Apr. 26, 2005

(54) HEAVY DUTY TOGGLE BOLT FASTENER ASSEMBLY, AND METHOD OF INSTALLING AND REMOVING THE SAME

(75) Inventor: Cheryl L. Panasik, Elburn, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/653,957

(22) Filed: Sep. 4, 2003

(65) Prior Publication Data

US 2005/0053444 A1 Mar. 10, 2005

(51) Int. Cl.[7] .................................... F16B 21/00
(52) U.S. Cl. .................. 411/342; 411/340; 411/344; 411/29; 411/31
(58) Field of Search .............................. 411/21, 29, 30, 411/31, 340, 342, 344

(56) References Cited

U.S. PATENT DOCUMENTS

| | | | | |
|---|---|---|---|---|
| 1,316,857 A | * | 9/1919 | Schilling, Sr. .............. 411/344 |
| 2,024,871 A | * | 12/1935 | Parsons ....................... 411/342 |
| 2,398,220 A | * | 4/1946 | Gelpcke ..................... 411/342 |
| 2,908,196 A | * | 10/1959 | Apfelzweig ................. 411/344 |
| 3,288,014 A | * | 11/1966 | Mortensen ................... 411/344 |
| 4,116,104 A | * | 9/1978 | Kennedy ..................... 411/427 |
| 4,449,873 A | | 5/1984 | Barth |
| 4,601,625 A | | 7/1986 | Ernst et al. |
| 4,764,065 A | * | 8/1988 | Johnson ........................ 411/21 |
| 4,822,226 A | * | 4/1989 | Kennedy ..................... 411/342 |
| 5,067,864 A | * | 11/1991 | Dewey et al. .............. 411/344 |
| 5,226,768 A | * | 7/1993 | Speer ........................ 411/21 X |
| 5,876,169 A | * | 3/1999 | Wrigley ...................... 411/344 |
| 6,435,789 B1 | * | 8/2002 | Gaudron ................... 411/29 X |

FOREIGN PATENT DOCUMENTS

DE          2446405      *   1/1979   ........... F16B/13/04

* cited by examiner

Primary Examiner—Robert J. Sandy
Assistant Examiner—Katherine Mitchell
(74) Attorney, Agent, or Firm—Schwartz & Weinrieb

(57) ABSTRACT

A toggle bolt fastener assembly comprises a tubular toggle housing body within which a coaxially disposed nut member is guidably moved in a translational manner. The nut member includes lug structure for preventing relative rotation or pivotal movement of the nut member with respect to the toggle housing body, and a pair of toggle wing members are pivotally mounted upon the nut member between radially contracted and radially expanded positions. A pair of compression sleeve members are also provided upon the toggle housing body for forcing the toggle wing members to their radially contracted positions, or for permitting the toggle wing members to move to their radially expanded positions depending upon the disposition of the nut member within the toggle housing body.

22 Claims, 3 Drawing Sheets

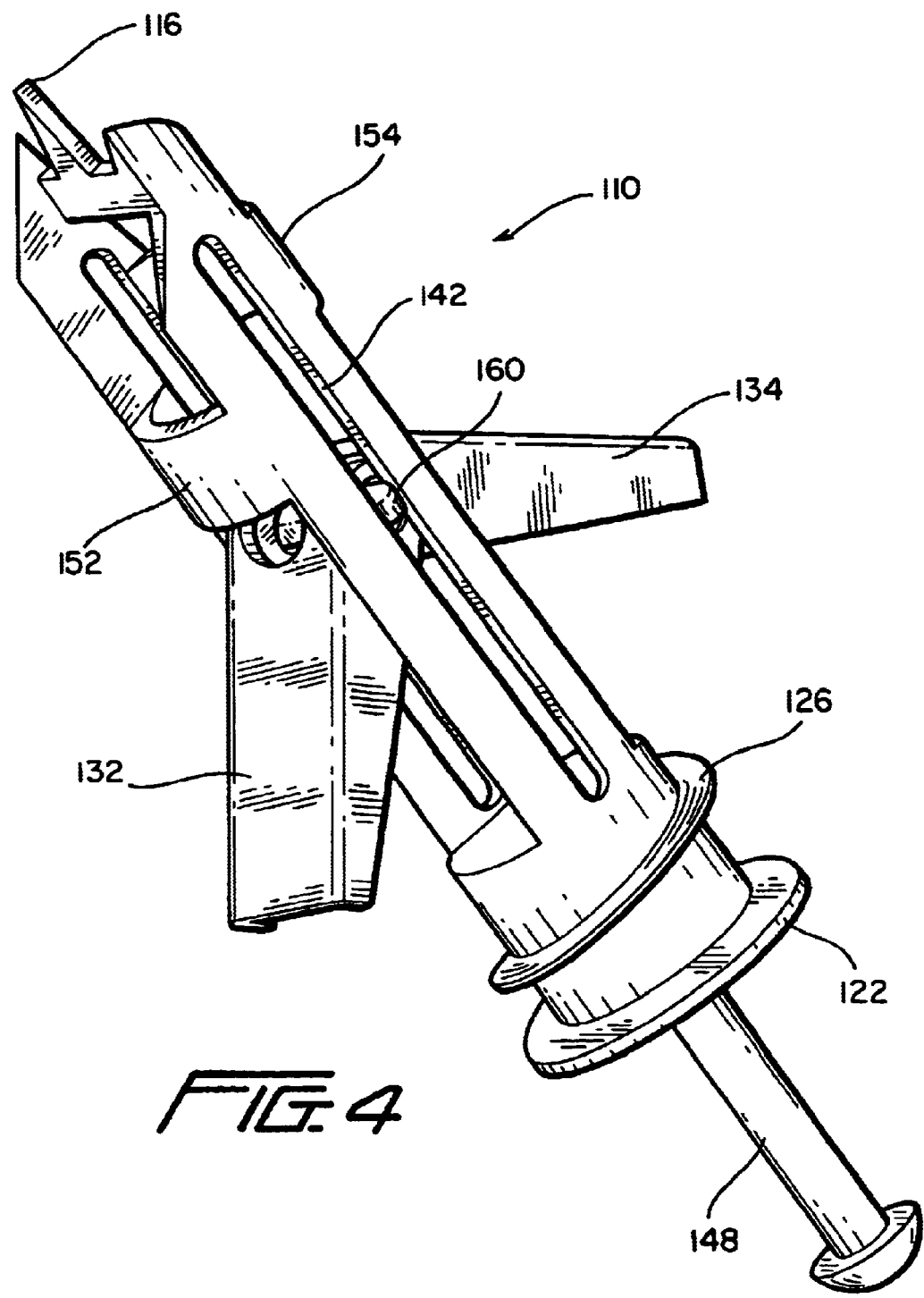

HEAVY DUTY TOGGLE BOLT FASTENER ASSEMBLY, AND METHOD OF INSTALLING AND REMOVING THE SAME

FIELD OF THE INVENTION

The present invention relates generally to toggle-bolt fastener assemblies for mounting various objects or articles, such as, for example, pictures, mirrors, shelving, lighting fixtures, brackets, and the like, upon drywall or support panel structures, and more particularly to a new and improved toggle-bolt fastener assembly wherein the fastener assembly comprises integrally incorporated structure for effectively ensuring the coaxial alignment of the nut member and the threaded engagement screw so as to, in turn, ensure the proper deployment of the toggle members from their stored positions to their drywall-engaging positions, and wherein further, the fastener assembly further comprises integrally incorporated structure for effectively permitting the fastener assembly to be removed from the drywall structure after the fastener assembly has been fully installed within the drywall structure, and without adversely affecting or damaging the structural integrity of the drywall structure, whereby the entire toggle-bolt fastener assembly can be repetitively re-used without the necessity for additional parts or the replenishment of component parts.

BACKGROUND OF THE INVENTION

Various fasteners have of course been developed within the past several decades, and are of course well-known in the building industry, which have been specifically adapted for use in connection with the mounting of various objects or articles, such as, for example, pictures, mirrors, shelving, brackets, lighting fixtures, and the like, upon drywall structures. Typical fasteners of the aforenoted type are disclosed, for example, within U.S. Pat. No. 5,067,864 which issued on Nov. 26, 1991 to Dewey et al., U.S. Pat. No. 4,601,625 which issued on Jul. 22, 1986 to Ernst et al., and U.S. Pat. No. 4,449,873 which issued on May 22, 1984 to Barth. It has been recognized in the industry that toggle-bolt fasteners, such as, for example, those disclosed within the aforenoted patents issued to Dewey et al. and Barth, as opposed to the non-toggle, threaded fastener as disclosed within the patent issued to Ernst et al., are particularly desirable in view of the fact that as a result of the tightened engagement of the toggle members with respect to or upon the rear or inner side or surface portion of the drywall structure, enhanced pull-out resistance of the fastener, with respect to the drywall structure, can be in fact be achieved whereby relatively large amounts of weight can effectively be supported upon the drywall structure. While the aforenoted types of toggle-bolt fasteners, as disclosed within the patents issued to Dewey et al. and Barth, have of course been generally satisfactory from an overall operational point of view, such fasteners do in fact exhibit some operational deficiencies. For example, in connection with the toggle-bolt fastener as disclosed within the patent issued to Dewey et al., in view of the fact that the toggle member or toggle clamp is pivotally mounted upon the fastener body portion of the toggle fastener so as to be movable between its first or original, axially oriented, inoperative or non-deployed position, and its second, transversely oriented, deployed or operative position as a result of being biased to the deployed or operative position by means of the threaded screw fastener inserted into the fastener body portion of the toggle fastener, if the toggle fastener is desired to be removed from drywall structure, the toggle fastener is not provided with any means for effectively pivotally moving the toggle member or toggle clamp from its operative or deployed position back to its inoperative or non-deployed position. Accordingly, in order to in fact remove the toggle fastener from the drywall structure, the original hole or aperture, through which the toggle fastener was originally inserted during installation of the toggle fastener within the drywall structure, would have to be substantially enlarged thereby effectively damaging the drywall structure and rendering the same non-usable unless and until repairs were made to the drywall structure prior to the re-installation of the toggle fastener within the drywall structure. Similar structural and operational deficiencies are likewise characteristic of the toggle fastener as disclosed within the patent which was issued to Barth.

Alternatively, conventional or PRIOR ART toggle fasteners are also available wherein, if it is desired to remove the toggle fastener from its mounted disposition upon the drywall structure, the threaded screw fastener is able to be readily threadedly disengaged or separated from the toggle members or clamps. It is noted, however, that under such circumstances, the toggle members or clamps will fall behind the rear or inner side or surface portion of the drywall structure, and accordingly, if the toggle fastener is to be reused, new toggle members or toggle clamps must be operatively threadedly mated with the threaded screw fastener. Obviously, these circumstances or situations require a larger number of toggle members or toggle clamps, as considered with respect to the number of threaded screw fasteners, which together comprise a predetermined number of toggle fasteners.

Still further, as can also be appreciated from the disclosures contained within the patents issued to Dewey et al. and Barth, while both of the disclosed toggle fasteners comprise structural means integrally incorporated therein for achieving the pivotal movement of the toggle member or toggle clamp so as to be pivotally movable between their first or original, axially oriented, inoperative or non-deployed positions, and their second, transversely oriented, deployed or operative positions, as a result of being biased to the deployed or operative positions by means of the threaded screw fastener inserted into the fastener body portion of the toggle fastener, it sometimes happens that the threaded screw fastener does not always properly or accurately engage the toggle member or toggle clamp so as to in fact cause the proper or complete pivotal movement of the toggle member or toggle clamp from their first or original, axially oriented, inoperative or non-deployed positions to their second, transversely oriented, deployed or operative positions. Accordingly, when the threaded screw fastener is fully threadedly inserted or installed so as to securely mount the particular object or article, such as, for example, the picture, mirror, shelving, bracket, lighting fixture, or the like, upon the drywall structure, the toggle member or toggle clamp will not properly or securely engage the rear or inner side or surface portion of the drywall structure whereby, in turn, the particular object or article will not be securely mounted upon the drywall structure. Such an existing state of the toggle fastener, as mounted within the drywall structure, therefore defines, in turn, a precarious mounting condition for the particular article or object as mounted upon the drywall structure with the very real possibility, or probability, of the article or object becoming dislodged from its mounted state upon the drywall structure.

OBJECTS OF THE INVENTION

Accordingly, it is an object of the present invention to provide a new and improved toggle bolt fastener for mounting within drywall structure in order to mount various articles or objects, such as, for example, pictures, mirrors, shelving, brackets, lighting fixtures, and the like, upon the drywall structures.

Another object of the present invention is to provide a new and improved toggle bolt fastener, for mounting in drywall structure in order to mount various objects or articles, such as, for example, pictures, mirrors, lighting fixtures, shelving, brackets, and the like, upon the drywall structures, which effectively overcomes the various structural and operational deficiencies, disadvantages, and drawbacks characteristic of conventional PRIOR ART toggle bolt fasteners.

An additional object of the present invention is to provide a new and improved toggle bolt fastener, for mounting within drywall structure in order to mount various articles or objects, such as, for example, pictures, mirrors, shelving, brackets, lighting fixtures, and the like, upon the drywall structures, which is capable of being readily removed from the drywall structure and re-used again within the same aperture or hole originally bored within the drywall structure.

A further object of the present invention is to provide a new and improved toggle bolt fastener, for mounting within drywall structure in order to mount various articles or objects, such as, for example, pictures, mirrors, shelving, brackets, lighting fixtures, and the like, upon the drywall structures, which comprises integrally incorporated structure for ensuring the proper alignment of, and engagement between, the threaded screw fastener and the toggle members or toggle clamps of the toggle bolt fastener assembly so as to, in turn, ensure the proper engagement of the toggle members or toggle clamps with the rear or inner side or surface portion of the drywall structure.

A last object of the present invention is to provide a new and improved toggle bolt fastener, for mounting within drywall structure in order to mount various articles or objects, such as, for example, pictures, mirrors, shelving, brackets, lighting fixtures, and the like, upon the drywall structures, which comprises integrally incorporated structure for ensuring the proper alignment of, and engagement between, the threaded screw fastener and the toggle members or toggle clamps of the toggle bolt fastener assembly so as to, in turn, ensure the proper engagement of the toggle members or toggle clamps with the rear or inner side or surface portion of the drywall structure whereby the secure, fixed mounting of the articles or objects upon the drywall structure is assured and is characterized by means of, or exhibits, a relatively high level of pull-out resistance.

SUMMARY OF THE INVENTION

The foregoing and other objectives are achieved in accordance with the teachings and principles of the present invention through the provision of a new and improved toggle bolt fastener which comprises a tubular toggle housing body having self-drilling structure provided at the leading or insertion tip end portion thereof, and relatively coarse thread means defined upon the opposite or trailing flanged head end portion thereof for engaging the drywall structure when the toggle bolt fastener is mounted within the drywall structure. The flanged head end portion has a substantially X-shaped recess portion defined therein for operatively receiving a suitable rotatable implement, such as, for example, a Phillips head screwdriver or a similarly-shaped tool bit disposed within a rotary tool. The tubular toggle housing body is further provided with a pair of axially or longitudinally staggered toggle member compression sleeves by means of, or within, which a pair of spring-biased toggle members or toggle clamps are disposed when the toggle members or toggle clamps are effectively retracted to their inoperative or non-deployed positions, and a plurality of, such as, for example, four, axially or longitudinally extending slots. The four axially or longitudinally extending slots are circumferentially spaced 90° apart with respect to each other whereby, for example, a first pair of oppositely disposed slots permit the spring-biased toggle members or toggle clamps, which are pivotally mounted upon an internally threaded nut member, to extend, project, or move therethrough when the spring-biased toggle members or toggle clamps are moved between their retracted, inoperative or non-deployed position and their extended operative or deployed position. In addition, the second pair of oppositely disposed slots have guide members, integrally formed upon the internally threaded nut member upon which the spring-biased toggle members or toggle clamps are pivotally mounted, projecting therethrough for guiding the nut member as the same moves axially or longitudinally as a result of being threadedly engaged and driven by means of a threaded screw fastener.

Accordingly, in view of the axially or longitudinal ly guided movement of the nut member, the properly aligned engagement between the nut member and the threaded screw fastener is ensured so as to in turn ensure the proper deployment of the spring-biased toggle clamps or toggle members for proper and secure engagement with the rear or inner side or surface portion of the drywall structure. Still further, the spring-biased toggle members or toggle clamps may be moved and accordingly manipulated, by means of the operative intercooperation between the nut member and the threaded screw fastener, so as to cause the spring-biased toggle members or toggle clamps to again be positioned internally within the toggle member compression sleeves. In this manner, the toggle bolt fastener may be removed intact from the drywall structure, and re-installed into the drywall structure, as may be desired and without causing any damage to the drywall structure.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 4 is a perspective view of the second embodiment of the new and improved toggle bolt fastener, as disclosed within FIG. 3, wherein the toggle wing members are being moved toward their operative expanded positions.

DETAILED DESCRIPTION OF THE PREFERRED EMBODIMENT

Figure 1:
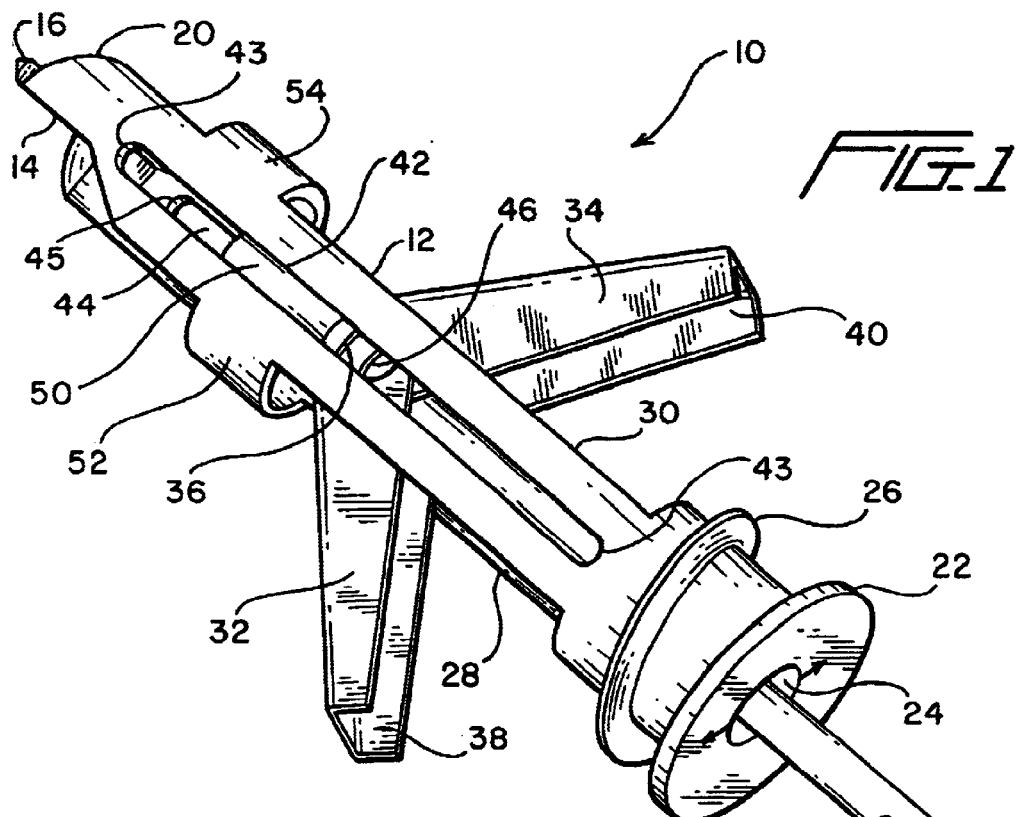
FIG. 1 is a perspective view of a first embodiment of a new and improved toggle bolt fastener constructed in accordance with the principles and teachings of the present invention and showing the cooperative parts thereof.

Referring now to the drawings, and more particularly to FIG. 1 thereof, a new and improved toggle bolt fastener assembly, constructed in accordance with the principles and teachings of the present invention, is disclosed and is generally indicated by the reference character 10. The toggle bolt fastener assembly 10 is uniquely adapted for mounting various objects or articles, such as, for example, pictures, mirrors, shelving, lighting fixtures, brackets, and the like, upon a drywall structure or assembly which comprises, for example, a drywall member secured upon vertically and horizontally oriented stud members. More particularly, the toggle bolt fastener assembly 10 is seen to comprise a substantially tubular toggle housing body 12, wherein the substantially tubular toggle housing body 12 has a drilling tip portion 14 provided upon the leading or insertion end portion thereof. The drilling tip portion 14 comprises a pointed, projecting spike member 16 located along the longitudinal axis 18 of the tubular toggle housing body 12, and an arcuate-shaped drilling or cutting surface 20. It can therefore be readily appreciated that when the toggle housing body 12 is to be mounted within the drywall member of the drywall structure or assembly, the spike member 16 will effectively be embedded within the drywall member of the drywall structure or assembly so as to define a pivot point around which the toggle housing body 12 is adapted to be rotated.

As a result of the rotation of the toggle housing body 12 around the longitudinal axis 18, the drilling or cutting surface 20 of the drilling tip portion 14 will proceed to cut or drill a hole within the drywall member of the drywall structure or assembly through which the toggle housing body 12 can be inserted whereby the toggle housing body 12 will pierce and extend through the drywall member of the drywall structure or assembly. In order to in fact be able to achieve the rotation of the toggle housing body 12 around the longitudinal axis 18, the end of the toggle housing body 12, which is opposite the drilling tip portion 14, is provided with a flanged head portion 22, and the flanged head portion 22 is, in turn, provided with a substantially X-shaped recessed portion 24 within which a suitable tool implement, such as, for example, a Phillips head screw-driver, or a similarly configured tool bit fixedly mounted within a rotary tool, can be engaged. Still further, a relatively large or coarsely threaded portion 26 is defined upon the external periphery of the toggle housing body 12 so as to be disposed within the vicinity of the flanged head portion 22. In this manner, when the toggle housing body 12 is inserted into and mounted within the drywall member of the drywall structure or assembly, the toggle housing body 12 will be threadedly engaged within the drywall member of the drywall structure or assembly so as to properly seat and retain the toggle housing body 12 within the drywall member of the drywall structure or assembly. At this time, the flanged head portion 22 of the toggle housing body 12 will be disposed in a substantially flush state with respect to the front or outer side or surface portion of the drywall member of the drywall structure or assembly.

Continuing further, it is seen that the tubular toggle housing body 12 is additionally provided with a first pair of axially or longitudinally oriented slots 28,30 which are defined within first diametrically opposite wall portions of the toggle housing body 12. A pair of toggle wings or clamping members 32,34 are respectively mounted upon a nut member 36 which is disposed internally within the tubular toggle housing body 12, and as a result of such mounting of the toggle wings or clamping members 32,34 upon the nut member 36, the toggle wings or clamping members 32,34 are adapted to pass through the first pair of diametrically opposed elongated slots 28,30, defined within the diametrically opposite wall portions of the toggle housing body 12, as the pair of toggle wings or clamping members 32,34 are moved between their radially inwardly contracted or retracted states or positions and their radially outwardly expanded states or positions. As is conventional, the pair of toggle wings or clamping members 32,34 are pivotally mounted upon suitable pintles or trunnions, not shown, so as to in fact be pivotally disposed around an axis which is oriented perpendicular to the substantially common plane within which the pair of toggle wings or clamping members 32,34 are disposed, and a coil spring member is mounted upon one of the pintles or trunnions, not shown, such that outwardly extending leg portions 38,40 of the coil spring member are respectively operatively engaged with the pair of toggle wings or clamping members 32, 34 so as to effectively bias the pair of toggle wings or clamping members 32,34 toward their radially outwardly expanded states or positions whereby the pair of toggle wings or clamping members 32,34 will together define a substantially V-shaped formation, as is illustrated.

In addition to the provision of the first pair of axially or longitudinally oriented slots 28,30, which are defined within the first diametrically opposite wall portions of the toggle housing body 12, a second pair of axially or longitudinally oriented slots 42,44 are similarly defined within second diametrically opposite wall portions of the toggle housing body 12. It is noted that the second pair of axially or longitudinally oriented slots 42,44, as defined within the second diametrically opposite wall portions of the toggle housing body 12, are effectively respectively interposed between the first pair of axially or longitudinally oriented slots 28,30 which are defined within the first diametrically opposite wall portions of the toggle housing body 12 such that the first pair of axially or longitudinally oriented slots 28,30 and the second pair of axially or longitudinally oriented slots 42,44 are alternatively disposed with respect to each other at positions which are circumferentially spaced apart with respect to each other through means of 90° angular separations. The nut member 36 has an axially located, internally threaded bore 46 within which an externally threaded shaft portion of an engagement screw 48 is adapted to be threadedly disposed when the engagement screw 48 is axially inserted into the toggle housing body 12 whereby the toggle bolt fastener 10 can be securely engaged with the drywall member of the drywall structure or assembly, as a result of the toggle wings or clamping members 32,34 engaging the rear or inner side or surface portion of the drywall member of the drywall structure or assembly, so as to in fact securely or fixedly mount an article or object upon the drywall member of the drywall structure or assembly, in a manner well-known in the art.

Continuing still further, in accordance with additional principles and teachings of the present invention, unique and novel structure is also provided upon the toggle bolt fastener 10 for achieving several critically important operational interrelationships. For example, unique and novel structure is provided upon the toggle bolt fastener 10 for ensuring the fact that when the externally threaded engagement screw 48 is adapted to be threadedly engaged with and mated within the internally threaded bore 46 of the nut member 36, the engagement screw 48 will in fact be inherently coaxially aligned with respect to the threaded bore 46 of the nut member 36. In addition, unique and novel structure is also provided upon the toggle bolt fastener 10 for ensuring the fact that the threaded engagement screw 48 will be inherently capable of threadedly engaging the threaded bore 46 of the nut member 36 so as to cause the desired longitudinal translational movement of the nut member 36 within and with respect to the toggle housing body 12. Still further, unique and novel structure is provided upon the toggle bolt fastener 10 so as to ensure the fact that the nut member 36, along with the toggle wings or clamping members 32,34, will always be retained upon the toggle housing body 12.

More particularly, the nut member 36 is provided with a pair of diametrically opposite, radially outwardly extending lugs or rib members 50, only one of which is visible in FIG. 1, and it is also appreciated from FIG. 1 that the lugs or rib members 50 are adapted to project through, and thereby be respectively slidably disposed within, the second pair of axially or longitudinally extending slots 42,44. In this manner, it will be appreciated that the lugs or rib members 50 not only effectively serve as a means for slidably guiding the nut member 36 within the tubular housing body 12 as the nut member 36 moves axially or longitudinally within the tubular housing body 12 in accordance with the longitudinal translational movements of the nut member 36, and the toggle wings or clamping members 32,34 mounted thereon, toward or away from the flanged head portion 22 of the toggle housing body 12 whereby the performance of the engagement and disengagement modes of operation of the toggle bolt fastener 10 with respect to the drywall member of the drywall structure or assembly can be achieved as will be more fully appreciated hereinafter, but in addition, the operative intercooperation defined between the lugs or rib members 50 and the second pair of axially or longitudinally extending slots 42,44 serves to prevent relative rotation of the nut member 36 with respect to the toggle housing body 12. In addition, in view of the fact that the toggle wings or clamping members 32,34 extend or project through the first pair of oppositely disposed axially or longitudinally oriented slots 28,30 defined within the first oppositely disposed side wall portions of the toggle housing body 12, while the lugs or rib members 50 similarly extend or project through the second pair of oppositely disposed axially or longitudinally oriented slots 42,44 defined within the second oppositely disposed side wall portions of the toggle housing body 12, wherein it is also noted that the second pair of oppositely disposed axially or longitudinally oriented slots 42,44 respectively have oppositely disposed closed or terminal end portions 43,45, then the nut member 36, along with the toggle wings or clamping members 32,34 disposed thereon, is always retained in a captured state upon the toggle housing body 12.

It will be further appreciated that the outer diameter of the nut member 36 is just slightly less than the internal diameter of the bore defined within the tubular toggle housing body 12, and in this manner, while the nut member 36 may freely move axially or longitudinally within the tubular toggle housing body 12, as effectively permitted or determined by means of the lugs or rib members 50 respectively projecting or extending outwardly through the second pair of axially or longitudinally extending slots 42,44, and as limited by means of the noted closed or terminal end portions of the second pair of longitudinally or axially extending slots 42, 44, the nut member 36 cannot be displaced from its coaxial disposition with respect to the longitudinal axis 18 and the threaded engagement screw 48 disposed therealong. Accordingly, the internally threaded bore 46 of the nut member 36 will always be coaxially aligned with respect to the threaded engagement screw 48 when the same is disposed along the longitudinal axis 18. In this manner, when the threaded engagement screw 48 is in fact inserted into and through the flanged head portion 22 of the toggle housing body 12 for engagement with the internally threaded bore 46 defined within the nut member 36, the coaxial alignment of the threaded engagement screw 48 with respect to the internally threaded bore 46 defined within the nut member 36 is always guaranteed or ensured.

Continuing still further, and most importantly, the translational movement of the nut member 36, having the toggle wings or clamping members 32,34 mounted thereon, along or with respect to the threaded engagement screw 48, as the threaded engagement screw 48 is rotated, is likewise positively ensured. Accordingly, in view of the proper threaded engagement defined between the threaded engagement screw 48 and the nut member 36, and the properly ensured translational movement of the nut member 36, having the toggle wings or clamping members 32,34 mounted thereon, along or with respect to the threaded engagement screw 48, then it is to be understood that when the outwardly projecting or outwardly extending toggle wings or clamping members 32,34 approach the rear or inner side or surface portion of the drywall member of the drywall structure or assembly, the toggle wings or clamping members 32,34 will be able to properly, securely, and tightly engage the rear or inner side or surface portion of the drywall member of the drywall structure or assembly so as to securely and assuredly mount the particular object or article upon the drywall member of the drywall structure or assembly.

With reference still being made to the FIG. 1, it is seen that the toggle housing body 12 further comprises a pair of axially or longitudinally spaced toggle compression sleeves 52,54. It is to be appreciated that each one of the axially or longitudinally spaced toggle compression sleeves 52,54 actually comprises a semi-cylindrical sleeve structure or housing, and that such semi-cylindrical sleeve structures or housings 52,54 are integrally formed upon diametrically opposite wall portions of the tubular toggle housing body 12 disposed upon opposite sides of the longitudinal axis 18. The semi-cylindrical toggle compression sleeve housings or structures 52,54 are disposed at axial positions that are located rearwardly of the drilling or cutting surface 20 and within the vicinity of the leading end extremities of the second pair of axially or longitudinally extending slots 42,44 defined within the tubular toggle housing body 12. Accordingly, it is further appreciated that the semi-cylindrical toggle compression sleeve structures or housings 52,54 are provided upon the tubular toggle housing body 12 so as to respectively operatively engage each one of the spring-biased toggle wings or clamping members 32,34 when the nut member 36 is translationally moved toward the drilling tip portion 14 of the toggle bolt fastener 10 as a result of being guided by means of the operative interaction defined between the lugs or rib members 50 provided upon the nut member 36 and the second pair of axially or longitudinally extending slots 42,44 defined within the toggle housing body 12. In this manner, when the toggle wings or clamping members 32,34 operatively engage the semi-cylindrical sleeve structures or housings 52,54, such as when the nut member 36 is moved toward and is disposed within the vicinity of the drilling tip portion 14 of the toggle bolt fastener 10, the toggle wings or clamping members 32,34 will be forced radially inwardly toward their contracted or retracted states or positions against the biasing forces of their respective spring members 38,40 and retained at such contracted or retracted states or positions, while when the toggle wings or clamping members 32,34 are operatively disengaged from the semi-cylindrical sleeve structures or housings 52,54, such as when the nut member 36 is moved toward and is disposed within the vicinity of the flanged head portion 22 of the toggle bolt fastener 10, the toggle wings or clamping members 32,34 will be permitted to move radially outwardly toward their expanded states or positions under the influence of the biasing forces of their respective spring members 38,40.

Having described the various structural features and components comprising the new and improved toggle bolt fastener 10 constructed in accordance with the principles and teachings of the present invention, the cyclic operational use of the new and improved toggle bolt fastener 10 of the present invention will now be described. More particularly, when the toggle bolt fastener 10 is to be initially installed within a drywall member of a drywall structure or assembly, the nut member 36 will be disposed within the leading or forward end portion of the toggle housing body 12 whereby the toggle wings or clamping members 32,34 will be disposed at their radially contracted or retracted inoperative positions or states as a result of having been respectively engaged and forced radially inwardly by means of the semi-cylindrical compression sleeve members 52,54. In addition, the tubular toggle housing body 12, not yet having the threaded engagement screw 48 disposed therein, will have its pointed, projecting spike member 16 disposed in contact with the outer or front side or surface portion of the drywall member of the drywall structure or assembly at the particular location at which the toggle bolt fastener 10 is to be mounted within the drywall member of the drywall assembly or structure. A Phillips head screw-driver, or a similarly configured tool bit disposed within a rotatably driven tool, is then inserted within the substantially X-shaped recessed portion 24 defined within the flanged head portion 22 of the toggle housing body 12, whereupon rotation of the toggle body housing 12 by means of the Phillips head screwdriver or the similarly configured tool bit, the toggle housing body 12 will be rotated around the longitudinal axis 18 such that the arcuate-shaped drilling or cutting surface 20 of the drilling tip portion 14 cuts or drills a hole or aperture within the drywall member of the drywall structure or assembly through which the toggle housing body 12 can then be inserted.

Continuing further, when the toggle housing body 12 has been inserted substantially entirely through the drilled hole or aperture formed within the drywall member of the drywall structure or assembly, the coarsely threaded portion 26 of the toggle housing body 12 will engage the drywall member of the drywall structure or assembly whereupon further or continued rotation of the toggle housing body 12, the coarsely threaded portion 26 of the toggle housing body 12 will threadedly embed itself within the drywall member of the drywall structure or assembly until the toggle housing body 12 has been fully inserted within the drywall member of the drywall structure or assembly whereby the flanged head portion 22 will be seated in a substantially flush manner with respect to and upon the outer or front side or surface portion of the drywall member of the drywall structure or assembly. At this point in time, the threaded engagement screw 48 is then inserted into the tubular toggle housing body 12 such that the forward or leading end portion of the threaded engagement screw 48 will encounter the internally threaded bore 46 defined within the nut member 36. In view of the fact that the nut member 36 is coaxially located within and with respect to the tubular toggle housing body 12, as a result of the fact that the outer diameter of the threaded engagement screw 48 is just slightly less than the inner diameter of the bore defined within the toggle housing body 12, the forward or leading end portion of the externally threaded engagement screw 48 will be readily, easily, and accurately aligned with and engaged within the internally threaded bore 46 defined within the nut member 36.

Continuing still further, as the threaded engagement screw 48 is threadedly engaged further with respect to the nut member 36 as a result of, for example, clockwise rotation thereof as viewed within FIG. 1, and in view of the structural intercooperation defined between the radially outwardly extending lugs or rib members 50 and the second pair of axially or longitudinally extending slots 42,44 defined within the diametrically opposite wall portions of the toggle housing body 12 whereby the nut member 36 is effectively restrained against rotation with respect to the toggle hosing body 12, the nut member 36 will be translationally moved in the longitudinal or axial direction toward the flanged head portion 22 of the toggle housing body 12. Accordingly, when the nut member 36 has been translationally moved a sufficient distance along the interior portion of the toggle housing body 12 such that the toggle wings or clamping members 32,34 begin to sequentially emerge from their constrained inoperative states or positions within the semi-cylindrical compression sleeve members 52,54, at which states or positions the toggle wings or clamping members 32,34 are disposed substantially parallel to the longitudinal axis 18, the spring end portions 38,40 will tend to bias the toggle wings or clamping members 32,34 toward their radially expanded positions or deployed states.

When the nut member 36 has been translationally moved an additional distance along the interior portion of the toggle housing body 12 such that the toggle wings or clamping members 32,34 have fully emerged from the semi-cylindrical compression sleeve members 52,54, the toggle wings or clamping members 32,34 will then be disposed at their expanded operative deployed positions. Ultimately, as the threaded engagement screw 48 is rotated still further in the clockwise direction, nut member 36 will be translationally moved in the longitudinal or axial direction toward the flanged head portion 22 of the toggle housing body 12 until the toggle wings or clamping members 32,34 contact and begin to clampingly engage the rear or inner side or surface of the drywall member of the drywall structure or assembly. Rotation of the threaded engagement screw 48, with the consequent translational movement of the nut member 36, is of course continued until the toggle wings or clamping members 32,34 fully, completely, and tightly engage the rear or inner side or surface of the drywall member of the drywall structure or assembly whereby the particular object or article, to be mounted upon the drywall member of the drywall structure or assembly, is in fact fixedly and securely mounted upon the drywall member of the drywall structure or assembly.

Alternatively, or conversely, if the toggle bolt fastener 10 is to be removed from the drywall member of the drywall structure or assembly after the toggle bolt fastener 10 has been installed within the drywall member of the drywall structure or assembly as has been described hereinbefore, such that the toggle bolt fastener 10 can be re-installed for subsequent use, the threaded engagement screw 48 is rotated in the reverse or counterclockwise direction. Due to the fact that the structural intercooperation defined between the radially outwardly extending lugs or rib members 50 and the second pair of axially or longitudinally extending slots 42,44 defined within the diametrically opposite wall portions of the toggle housing body 12 effectively restrains any rotation of the nut member 36 with respect to the toggle hosing body 12, the threaded engagement screw 48 will be translationally moved in the axial or longitudinal direction with respect to the nut member 36 so as to be retracted away from the flanged head portion 22 of the toggle housing body 12. Rotation of the threaded engagement screw 48 is continued in the counterclockwise direction with respect to the nut member 36 until the nut member 36 is again effectively disposed upon the leading end portion of the threaded engagement screw 48 whereupon the subassembly, comprising the threaded engagement screw 48 and the nut member 36, can be moved in the axial or longitudinal direction, with respect to and internally within the toggle housing body 12, toward the drilling tip portion 14 of the toggle housing body 12. As a result of such movement of the subassembly, comprising the threaded engagement screw 48 and the nut member 36, in the axial or longitudinal direction with respect to and internally within the toggle housing body 12, the nut member 36 will approach the first one of the semi-cylindrical toggle compression sleeves 52 whereby the toggle wing or clamping member 32 will begin to be biased radially inwardly against the biasing force of the spring end member 38, and in a similar manner, as nut member 36 continues its translational movement toward the drilling tip portion 14 of the toggle housing body 12, the nut member 36 will approach the second one of the semi-cylindrical toggle compression sleeves 54 whereby the toggle wing or clamping member 34 will likewise begin to be biased radially inwardly against the biasing force of the spring end member 40.

Subsequent to the aforenoted operations, once the nut member 36 has been fully encompassed within the semi-cylindrical toggle compression sleeves 52,54 such that the toggle wings or clamp members 32,34 have been moved to their fully contracted or retracted states or positions, the threaded engagement screw 48 is completely disengaged from the nut member 36 and removed from the toggle housing body 12 so as to in turn permit the removal of the particular object or article which has been mounted upon the drywall structure or assembly. A Phillips head screwdriver or similarly configured tool bit can then be inserted within the recessed portion 24 of the flanged head portion 22 of the toggle housing body 12 so as to threadedly disengage and withdraw the toggle housing body 12 from the drywall member of the drywall structure or assembly. The toggle bolt fastener 10 can then be used again so as to, for example, mount a different article or item upon the drywall structure or assembly.

Figure 2:
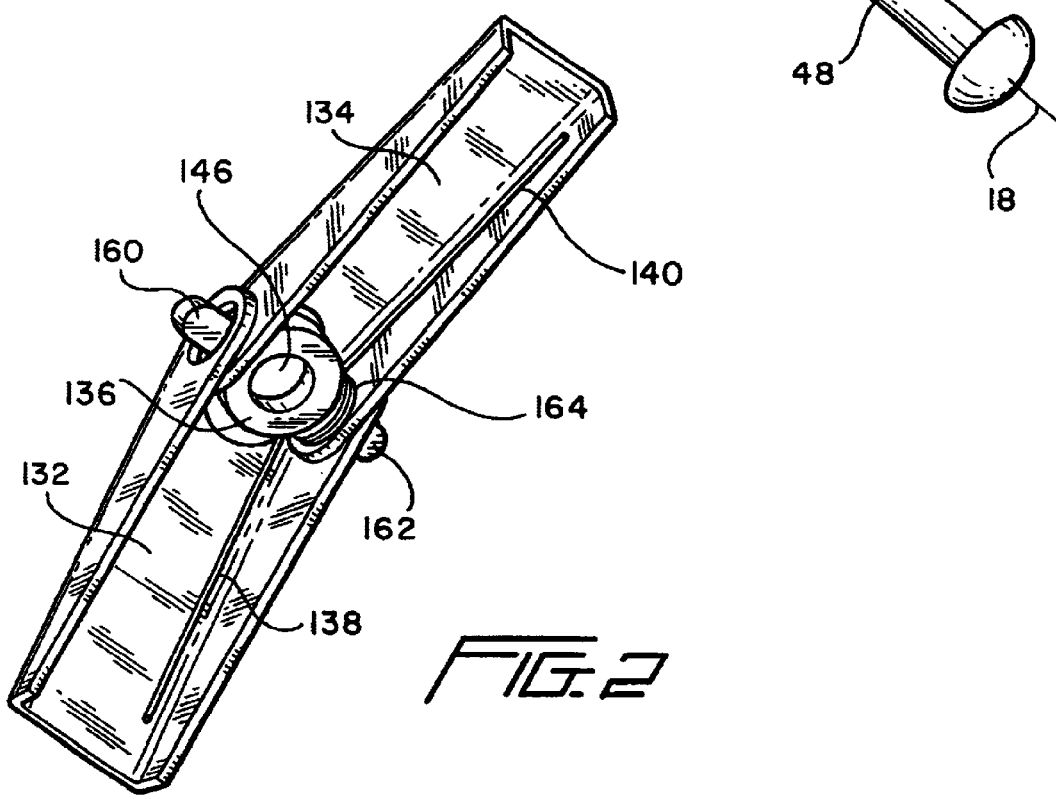
FIG. 2 is a perspective view of a modified toggle assembly, also constructed in accordance with the principles and teachings of the present invention, which can be used in lieu of the toggle assembly incorporated within the toggle bolt fastener illustrated within FIG. 1.
Figure 3:
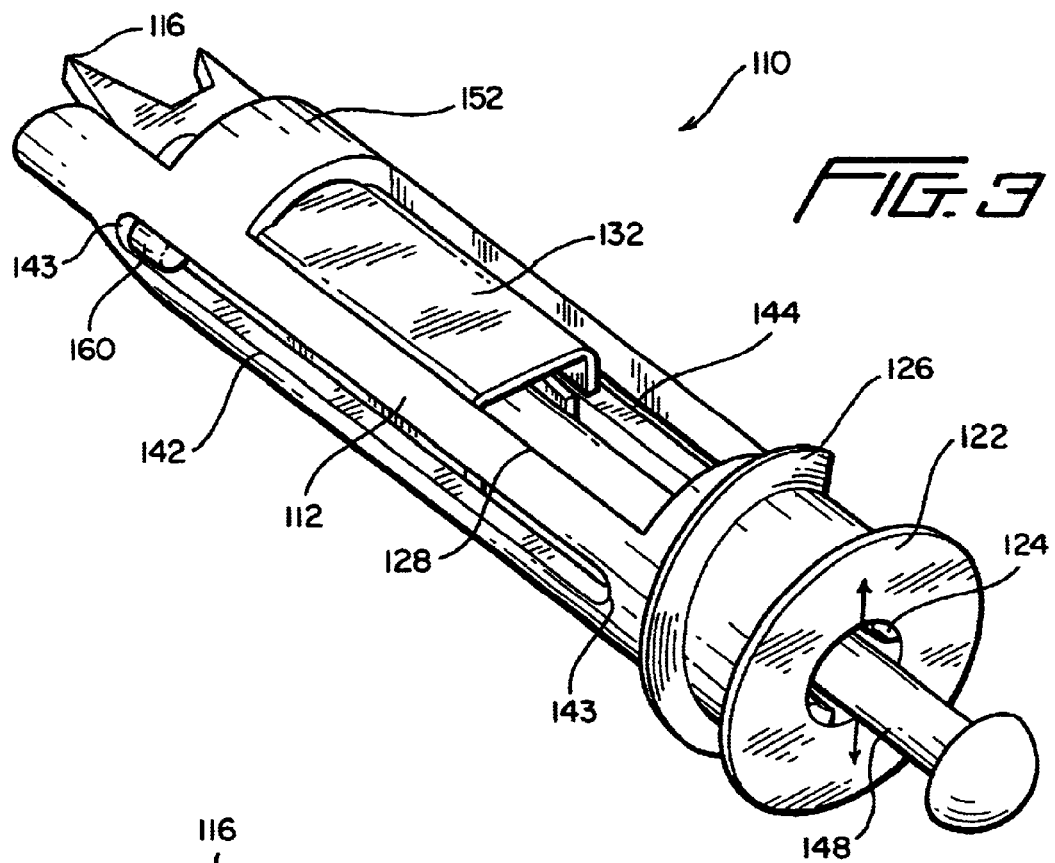
FIG. 3 is a perspective view of a second embodiment of a new and improved toggle bolt fastener, similar to the first embodiment toggle bolt fastener as disclosed within FIG. 1, which has also been constructed in accordance with the principles and teachings of the present invention, and which shows the cooperative parts thereof including, in particular, the modified toggle assembly as disclosed within FIG. 2, wherein the toggle wing members are disposed at their inoperative contracted positions.
Figure 5:
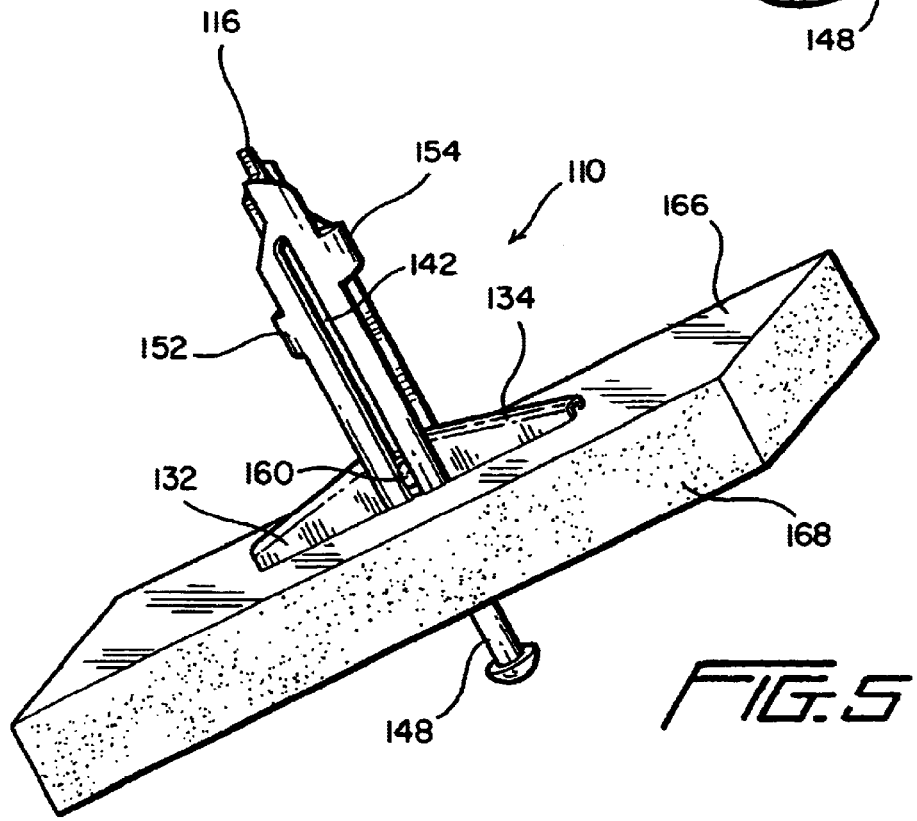
FIG. 5 is a perspective view of the second embodiment of the new and improved toggle bolt fastener, as disclosed within FIGS. 3 and 4, wherein the toggle wing members are disposed at their operative expanded positions and are operatively engaged with the rear surface portion of the drywall member.

With reference now being made to FIGS. 2–5, a modified embodiment of a toggle bolt fastener assembly, having a modified toggle assembly operatively disposed therein, as constructed in accordance with additional teachings and principles of the present invention, and which is likewise adapted for use within drywall structures or assemblies, is illustrated and is generally indicated by the reference character 110. It is to be noted that the toggle bolt fastener assembly 110, as disclosed within FIGS. 3–5, is substantially the same as the toggle bolt fastener assembly 10 as disclosed within FIG. 1, except as will be noted shortly hereinafter, and therefore, a detailed description of the toggle bolt fastener assembly 110, and the operation thereof, will be omitted herefrom for brevity purposes, the description of the toggle bolt fastener assembly 110 therefore being confined to those structural features incorporated within the toggle bolt fastener assembly 110 which are different from, or are in addition to, those structural features characteristic of the toggle bolt fastener assembly 10. It is accordingly noted, still further, that the various structural features characteristic of the toggle bolt fastener assembly 110 will be designated by means of reference characters similar to those utilized in connection with the toggle bolt fastener assembly 10 except that the reference characters for the toggle bolt fastener assembly 110 will be within the 100 series.

More particularly, it is noted, as may best be seen in FIG. 2, that the toggle assembly comprises toggle wings or clamping members 132,134 which are pivotally mounted with respect to each other upon the nut member 136 so as to effectively define a conventionally-shaped V-shaped formation therebetween. The nut member 136 is provided with its axially central internally threaded hole or aperture 146, and in accordance with the modified structure characteristic of the nut member 136, as compared to the structure characteristic of the nut member 36 as disclosed within FIG. 1, the annular body portion of the nut member 136 has a pair of diametrically oriented lug members 160,162 extending outwardly away from the annular body portion of the nut member 136 in opposite directions. As can be appreciated from FIGS. 2–5, it is to be appreciated that such lug members 160,162 serve several functions. For example, as can best be appreciated from FIG. 2, the lug members 160,162 effectively serve as the trunnions upon which the toggle wings or clamping members 132,134 are pivotally mounted with respect to each other, and in addition, it is seen that, for example, the lug member 162 likewise serves as a support member upon which the central coiled body portion of the coil spring member 164, from which the oppositely extending spring end portions 138,140 project outwardly for respective engagement with the toggle wings or clamping members 132,134, is mounted. In addition, as can be further appreciated from FIGS. 3–5, the lug members 160,162 effectively replace the lug or rib members 50 of the nut member 36, as disclosed within FIG. 1, so as to project or extend outwardly through the axially or longitudinally extending slots 142,144. Still yet further, the contracted or retracted state or position of the toggle wings or clamping members 132,134 is clearly illustrated within FIG. 3, while conversely, the outwardly expanded state or position of the toggle wings or clamping members 132,134 is clearly illustrated within FIG. 4. Lastly, the outwardly expanded state or position of the toggle wings or clamping members 132,134, as engageable with the inner or rear side surface portion 166 of a drywall member 168 of a drywall structure or assembly, is illustrated within FIG. 5. Accordingly, upon complete tightening or threaded engagement of the threaded engagement screw 148 with respect to the nut member 136, the toggle bolt fastener assembly 110 will be fully and fixedly engaged or mounted upon the drywall member 168. In particular, it is to be noted, for example, that tests have demonstrated the fact that with the new and improved toggle bolt fastener assemblies 10,110, as have been constructed in accordance with the principles and teachings of the present invention, enhanced pull-out resistance, on the order of twenty-five percent (25%), as compared to conventional toggle bolt assemblies, is able to be achieved.

Thus, it may be seen that in accordance with the principles and teachings of the present invention, there has been provided a new and improved toggle bolt assembly that comprises structure which ensures the coaxial alignment of the threaded engagement screw and the nut member upon which the toggle wings or clamping members are pivotally mounted. In this manner, the proper threaded engagement between the threaded engagement screw and the nut member is likewise ensured such that as a result of the rotation of the threaded engagement screw with respect to the nut member, the nut member will be properly translated along the toggle housing body whereby the toggle wings or clamping members will be reliably, securely, and tightly engaged with the rear or inner side or surface portion of the drywall member of the drywall structure or assembly. In addition, the structure also permits the toggle bolt fastener to be removed from the drywall structure or assembly, after having been installed within the drywall structure or assembly, with all components parts of the toggle bolt fastener, such as, for example, the nut member and the toggle wings or clamping members pivotally mounted thereon, to be retained upon the toggle bolt fastener.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A toggle bolt fastener assembly for mounting articles upon a panel member, comprising:

a toggle housing body, defining a longitudinal axis, to be mounted within a panel member;

first and second pairs of longitudinally extending slots respectively defined within first and second pairs of oppositely disposed side wall portions of said toggle housing body;

a nut member movably mounted within said toggle housing body along said longitudinal axis of said toggle housing body;

toggle means mounted upon said nut member for movement between first inoperative positions at which said toggle means are disposed substantially internally within said toggle housing body so as to permit said toggle housing body to be inserted into and removed from the panel member, and second operative positions at which said toggle means project outwardly through said first pair of slots defined within said first oppositely disposed side wall portions of said toggle housing body so as to fixedly retain said toggle housing body mounted within the panel member;

sleeve means mounted upon said toggle housing body for enabling said toggle means to project outwardly to said second operative positions, and for causing said toggle means to be retracted inwardly to said first inoperative positions, depending upon the disposition of said nut member along said longitudinal axis of said toggle housing body, such that said toggle means can be repetitively moved between said first inoperative and second operative positions whereby said toggle bolt fastener assembly can be repetitively mounted upon and removed from the panel member so as to be re-used for repetitively mounting articles upon the panel member; and lug means defined upon said nut member and projecting outwardly through said second pair of slots defined within said second oppositely disposed side wall portions of said toggle housing body so as to prevent pivotal movement of said nut member with respect to said toggle housing body and thereby ensure the threaded engagement of a threaded fastener with said nut member such that said nut member can move translationally along said longitudinal axis of said toggle housing body when the threaded fastener is rotated around said longitudinal axis of said toggle housing body.

2. The toggle bolt fastener assembly as set forth in claim 1 wherein:

said toggle housing body has a tubular configuration defining said longitudinal axis; and said nut member is movable internally within said tubular toggle housing body along said longitudinal axis thereof.

3. The toggle bolt fastener assembly as set forth in claim 2, wherein:

said toggle means comprises a pair of toggle wing members pivotally mounted upon said nut member between said first inoperative positions at which said pair of toggle wing members are radially contracted with respect to each other so as to be disposed substantially parallel to said longitudinal axis of said toggle housing body, and said second operative positions at which said pair of toggle wing members are radially expanded so as to, together, achieve a substantially V-shaped configuration.

4. The toggle bolt fastener assembly as set forth in claim 3, further comprising:

spring means operatively associated with said pair of toggle wing members for causing said radial expansion of said pair of toggle wing members from said first inoperative positions toward said second operative positions.

5. The toggle bolt fastener assembly as set forth in claim 4, wherein:

said spring means is mounted upon said nut member.

6. The toggle bolt fastener assembly as set forth in claim 4, wherein said sleeve means mounted upon said toggle housing body for enabling said toggle means to be repetitively moved between said first inoperative and second operative positions, comprises:

a pair of toggle compression sleeve members fixedly mounted upon said tubular toggle housing body for accommodating said nut member and for operatively engaging said pair of toggle wing members, mounted upon said nut member, so as to cause said pair of toggle wing members to be moved from said second operative expanded positions to said first contracted inoperative positions against the biasing force of said spring means.

7. The toggle bolt fastener assembly as set forth in claim 3, wherein:

said first and second pairs of longitudinally extending slots are respectively defined within first and second diametrically opposed side wall portions of said tubular toggle housing body such that said first and second pairs of longitudinally extending slots are disposed within diametrical planes offset 90° with respect to each other.

8. The toggle bolt fastener assembly as set forth in claim 7, wherein said lug means defined upon said nut member for preventing pivotal movement of said nut member with respect to said toggle housing body comprises:

a pair of radially outwardly projecting lug members disposed upon said nut member are respectively disposed within said second pair of longitudinally extending slots defined within second diametrically opposed side wall portions of said tubular toggle housing body so as to prevent pivotal movement of said nut member with respect to said toggle housing body and thereby ensure the threaded engagement of the threaded fastener with said nut member such that said nut member can be translationally moved internally within said tubular toggle housing body along said longitudinal axis thereof as a result of the threaded engagement thereby by the threaded fastener as the threaded fastener is rotated around said longitudinal axis of said toggle housing body.

9. The toggle bolt fastener assembly as set forth in claim 8, wherein:
said toggle housing body has a predetermined internal diametrical extent; and
said nut member has a predetermined external diametrical extent which is just slightly less than said internal diametrical extent of said toggle housing body.

10. The toggle bolt fastener assembly as set forth in claim 2, wherein:
said toggle housing body has self-drilling means formed upon a first end portion of said toggle housing body so as to facilitate the insertion of said toggle housing body into the panel member when said toggle housing body is rotated around said longitudinal axis thereof.

11. The toggle bolt fastener assembly as set forth in claim 10, wherein:
said toggle housing body has a flanged head member formed upon a second opposite end portion of said toggle housing body for mounting said toggle housing body in a substantially flush member upon the panel member when said toggle housing body is fully inserted within the panel member; and
recess means is defined within said flanged head member of said toggle housing body for accommodating a rotary tool so as to facilitate the rotation of said toggle housing body around said longitudinal axis of said toggle housing body so as to permit said self-drilling means of said toggle housing body to cut a hole within the panel member through which said toggle housing body can be inserted for mounting within the panel member.

12. A toggle bolt fastener assembly for mounting articles upon a panel member, comprising:
a toggle housing body, defining a longitudinal axis, to be mounted within a panel member;
first and second pairs of longitudinally extending slots respectively defined within first and second pairs of oppositely disposed side wall portions of said toggle housing body;
a nut member movably mounted within said toggle housing body and having an internally threaded bore adapted to be threadedly engaged with a threaded fastener whereby said nut member can be moved translationally along said longitudinal axis of said toggle housing body when the threaded fastener is rotated around said longitudinal axis of said toggle housing body;
toggle means mounted upon said nut member for movement between first inoperative positions at which said toggle means are disposed substantially internally within said toggle housing body so as to permit said toggle housing body to be inserted into and removed from the panel member, and second operative positions at which said toggle means project outwardly through said first pair of slots defined within said first oppositely disposed side wall portions of said toggle housing body so as to fixedly retain said toggle housing body mounted within the panel member;
sleeve means mounted upon said toggle housing body for enabling said toggle means to project outwardly to said second operative positions, and for causing said toggle means to be retracted inwardly to said first inoperative positions, depending upon the disposition of said nut member along said longitudinal axis of said toggle housing body, such that said toggle means can be repetitively moved between said first inoperative and second operative positions whereby said toggle bolt fastener assembly can be repetitively mounted upon and removed from the panel member so as to be re-used for repetitively mounting articles upon the panel member; and
lug means defined upon said nut member and projecting outwardly through said second pair of slots defined within said second oppositely disposed side wall portions of said said toggle housing body for operatively cooperating with said toggle housing body so as to mount said nut member within said toggle housing body in such a manner that said internally threaded bore of said nut member is always disposed coaxially with respect to said longitudinal axis defined within said toggle housing body, when said toggle means is disposed at both said first inoperative and second operative positions with respect to said toggle housing body, so as to ensure the proper threaded engagement of the threaded fastener with said nut member and the translational movement of said nut member along said longitudinal axis of said toggle housing body when the threaded fastener is rotated around said longitudinal axis of said toggle housing body.

13. The toggle bolt fastener assembly as set forth in claim 12, wherein:
said toggle housing body has a tubular configuration defining said longitudinal axis; and
said nut member is movable internally within said tubular toggle housing body along said longitudinal axis thereof.

14. The toggle bolt fastener assembly as set forth in claim 13, wherein:
said toggle means comprises a pair of toggle wing members pivotally mounted upon said nut member between said first inoperative positions at which said pair of toggle wing members are radially contracted with respect to each other so as to be disposed substantially parallel to said longitudinal axis of said toggle housing body, and said second operative positions at which said pair of toggle wing members are radially expanded so as to, together, achieve a substantially V-shaped configuration.

15. The toggle bolt fastener assembly as set forth in claim 14, further comprising:
spring means operatively associated with said pair of toggle wing members for causing said radial expansion of said pair of toggle wing members from said first inoperative positions toward said second operative positions.

16. The toggle bolt fastener assembly as set forth in claim 15, wherein:
said spring means is mounted upon said nut member.

17. The toggle bolt fastener assembly as set forth in claim 15, wherein said sleeve means mounted upon said toggle housing body for enabling said toggle means to be repetitively moved between said first inoperative and second operative position comprises:

a pair of toggle compression sleeve members fixedly mounted upon said tubular toggle housing body for accommodating said nut member and for operatively engaging said pair of toggle wing members, mounted upon said nut member, so as to cause said pair of toggle wing members to be moved from said second operative expanded positions to said first contracted inoperative positions against the biasing forces of said spring means.

18. The toggle bolt fastener assembly as set forth in claim 14, wherein:

said first and second pairs of longitudinally extending slots are respectively defined within first and second diametrically opposed side wall portions of said tubular toggle housing body such that said first and second pairs of longitudinally extending slots are disposed within diametrical planes offset 90° with respect to each other.

19. The toggle bolt fastener assembly as set forth in claim 18, wherein said lug means defined upon said nut member for mounting said nut member within said toggle housing body such that said internally threaded bore of said nut member is always disposed coaxially with respect to said longitudinal axis defined within said toggle housing body, comprises:

a pair of radially outwardly projecting lug members disposed upon said nut member and respectively disposed within said second pair of longitudinally extending slots defined within second diametrically opposed side wall portions of said tubular toggle housing body so as to ensure said nut member is always disposed coaxially with respect to said longitudinal axis of said toggle housing body and thereby permit the threaded fastener to properly threadedly engage said nut member so as to thereby move said nut member translationally along said longitudinal axis of said toggle housing body when the threaded fastener is rotated around said longitudinal axis of said toggle housing body.

20. The toggle bolt fastener assembly as set forth in claim 13, wherein:

said toggle housing body has self-drilling means formed upon a first end portion of said toggle housing body so as to facilitate the insertion of said toggle housing body into the panel member when said toggle housing body is rotated around said longitudinal axis thereof.

21. The toggle bolt fastener assembly as set forth in claim 20, wherein:

said toggle housing body has a flanged head member formed upon a second opposite end portion of said toggle housing body for mounting said toggle housing body in a substantially flush member upon the panel member when said toggle housing body is fully inserted within the panel member; and recess means is defined within said flanged head member of said toggle housing body for accommodating a rotary tool so as to facilitate the rotation of said toggle housing body around said longitudinal axis of said toggle housing body so as to permit said self-drilling means of said toggle housing body to cut a hole within the panel member through which said toggle housing body can be inserted for mounting within the panel member.

22. The toggle bolt fastener assembly as set forth in claim 12, wherein:

said toggle housing body has a predetermined internal diametrical extent; and said nut member has a predetermined external diametrical extent which is just slightly less than said internal diametrical extent of said toggle housing body.

\* \* \* \* \*